UNITED STATES PATENT OFFICE.

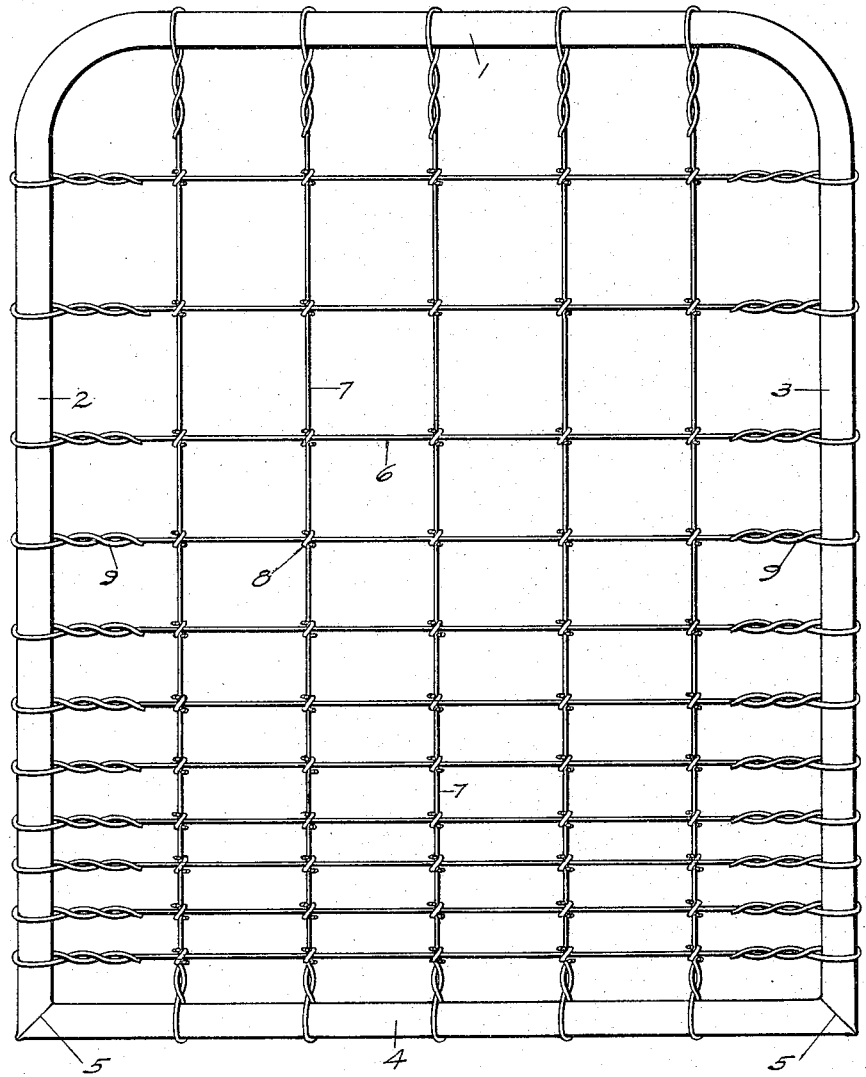

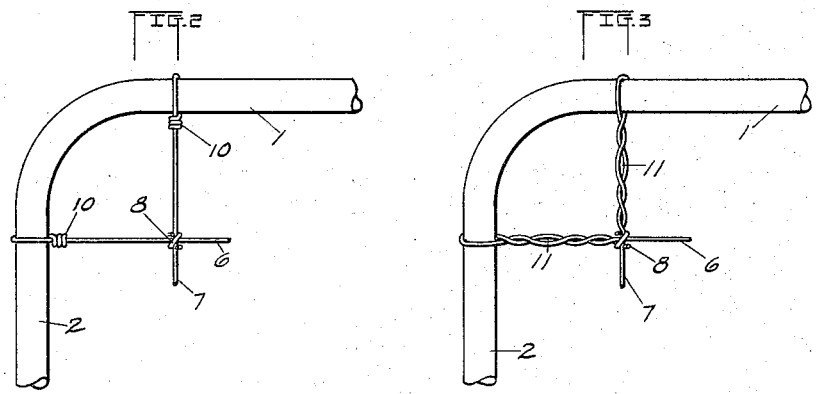

WILLIAM H. SOMMER, OF PEORIA, ILLINOIS.

GATE.

1,157,055.  Specification of Letters Patent.  Patented Oct. 19, 1915.

Application filed January 24, 1914. Serial No. 814,199.

*To all whom it may concern:*

Be it known that I, WILLIAM H. SOMMER, a citizen of the United States, residing at Peoria, in the county of Peoria and State of Illinois, have invented new and useful Improvements in Gates, of which the following is a specification.

This invention has reference to certain new and useful improvements in gates, and has for its object to provide an efficient means for securing the opposite ends of the longitudinal wires to the opposite vertical bars of the gate frame, and also the attaching of the upper and lower ends of the vertical wires with the top and bottom bars of said frame.

The invention has for a further object a gate, comprising top and end bars formed of an integral part and bent into shape and a bottom bar united to the ends of the end bars by a miter-joint; a wire body comprising a plurality of longitudinal wires and vertical wires crossing said longitudinal wires, said wires being suitably joined where they cross, and the ends of the longitudinal wires, and also said vertical wires, being secured to the frame, preferably by being passed around the frame members and twisted with their own body portions.

In the drawings:—Figure 1 is a view of my improved gate, showing the preferred attachment of the ends of the wires to the frame; Fig. 2 is a detailed view showing a modification of the wire attachment to the frame; Fig. 3 shows further modification of the manner of securing the ends of the wires to the frame.

Like characters of reference denote corresponding parts throughout the figures.

The frame of the gate comprises the top and two end bars, 1, 2 and 3, and the bottom bar 4. The top and two end bars are bent into an inverted U from an integral tubular bar, and the ends of said end bars are united to said bottom bar by miter-joints 5.

The longitudinal wires are designated 6 and the vertical wires 7. These wires where they cross are preferably joined by a staple lock or tie 8, but may be connected in other suitable manner.

As shown in Fig. 1, the ends of the longitudinal and vertical wires are each joined or attached to the frame in a similar manner, so that the description of one will suffice for all. An end of a wire is passed around a bar of the frame and preferably twisted with the body of the wire at 9. Carrying the ends of the wires around the bars stretches the wires, and when the ends are twisted with the body of the wire, they are held taut and such twists being adjacent the bars, adds strength to the filler of the frame.

In Fig. 2, the ends of the wires 6 and 7 are passed around bars of the frame and such ends wrapped or coiled, as at 10, about the body of the wire.

In Fig. 3 the ends of the wires 6 and 7 after being passed around the bars of the frame are intertwisted with the body of the wires as at 11, by a right and left, or left and right intertwist.

What I claim is:—

1. In a gate, a frame comprising top, bottom and end bars, and a rigid wire body for said frame, each wire of said body having its ends passed around bars of the frame and joined to itself by right and left intertwists.

2. In a gate, a frame comprising integral top and end bars formed into an inverted U, a bottom bar connected to the ends of said end bars by a miter-joint, and a rigid wire body for said frame, said wire body including longitudinal and vertical wires, the ends of each of said wires being passed around a bar of the frame and joined to itself by being twisted therewith.

WILLIAM H. SOMMER.

Witnesses:
 EDWIN G. SCHAEFFER,
 CHAS. N. LA PORTE.

Copies of this patent may be obtained for five cents each, by addressing the "Commissioner of Patents, Washington, D. C."